United States Patent [19]
Fischer

[11] Patent Number: 5,342,157
[45] Date of Patent: Aug. 30, 1994

[54] IMPACT-TYPE EXPANSIBLE PLUG FOR ANCHORING IN A CYLINDRICAL DRILLED HOLE

[75] Inventor: Artur Fischer, Tumlingen/Waldachtal, Fed. Rep. of Germany

[73] Assignee: fischerwerke Artur Fischer GmbH & Co. KG, Waldachtal, Fed. Rep. of Germany

[21] Appl. No.: 89,768

[22] Filed: Jul. 9, 1993

[30] Foreign Application Priority Data

Aug. 6, 1992 [DE] Fed. Rep. of Germany ....... 4226011

[51] Int. Cl.$^5$ .............................................. F16B 13/06
[52] U.S. Cl. .......................................... 411/60; 411/72; 411/908
[58] Field of Search ................. 411/54, 60, 61, 72–74, 411/902, 908

[56] References Cited

U.S. PATENT DOCUMENTS

| | | | |
|---|---|---|---|
| 1,000,715 | 8/1911 | Caywood | 411/60 |
| 1,392,108 | 9/1921 | Bilterman | 411/60 |
| 2,370,327 | 2/1945 | Rosan. | |
| 2,616,328 | 11/1952 | Kingsmore | 411/60 |
| 2,707,897 | 5/1955 | Beeson | 411/60 |
| 3,916,480 | 11/1975 | Smith | 411/60 X |
| 4,488,843 | 12/1984 | Achille | 411/60 X |
| 5,002,445 | 3/1991 | Fischer | 411/60 X |
| 5,176,481 | 1/1993 | Schiefer | 411/60 |

FOREIGN PATENT DOCUMENTS

| | | |
|---|---|---|
| 1772225 | 4/1958 | Fed. Rep. of Germany. |
| 7618461 | 3/1978 | Fed. Rep. of Germany. |
| 3511784 | 2/1986 | Fed. Rep. of Germany. |
| 3533220 | 4/1987 | Fed. Rep. of Germany. |
| 3622937 | 1/1988 | Fed. Rep. of Germany. |
| 3833774 | 4/1990 | Fed. Rep. of Germany. |
| 356432 | 11/1905 | France. |

*Primary Examiner*—Neill R. Wilson
*Attorney, Agent, or Firm*—Michael J. Striker

[57] ABSTRACT

An impact-type expansible plug for anchoring in a cylindrical drilled hole of a concrete part and the like has an expansion sleeve provided with at least one longitudinal slot and expandable in a drilled hole, and also has an expansion sleeve with a conically narrowing internal bore, and an expansion mandrel drivable into the conically narrowing internal bore of the expansion sleeve. The expansion sleeve has a forward end provided with an annular collar having a radially directed circumferential cutting edge, and also has a portion tapering toward the annular collar.

8 Claims, 1 Drawing Sheet

IMPACT-TYPE EXPANSIBLE PLUG FOR ANCHORING IN A CYLINDRICAL DRILLED HOLE

BACKGROUND OF THE INVENTION

The present invention relates to an impact-type expansible plug for anchoring in a cylindrical drilled hole.

More particularly, it relates to an impact-type expansible plug which has a longitudinally slit expansion sleeve and an expansion mandrel which can be driven into a conically narrowing internal bore of the expansion sleeve.

Impact-type expansible plugs of the above-mentioned general type are known in the art. One of such plugs is disclosed for example in the German document DE 38 33 774 C1 and is usable for anchoring in a drilled hole which is widened conically inwardly. This known impact-type expansible plug has an expansion sleeve with a narrowing internal bore into which an expansion mandrel can be driven. The outer surface of the expansion sleeve in the expansible region is cylindrical. When the impact-type expansible plug is used in a cylindrical drilled hole it would, however, be impossible to drive the expansion mandrel into the narrowing internal bore of the expansion sleeve.

SUMMARY OF THE INVENTION

Accordingly, it is an object of the present invention to provide an impact-type expansible plug of the above-mentioned general design, which avoids the disadvantages of the prior art.

More particularly, it is an object of the present invention to provide an impact-type expansible plug for anchoring in a cylindrical drilled hole, which makes possible an interlocking connection in a concrete part or other corresponding masonry.

In keeping with these objects and with others which will become apparent hereinafter, one feature of the present invention resides, briefly stated, in an impact-type expansible plug, in which the expansion sleeve tapers towards its front free end as far as an annular collar which has a radially directed circumferential cutting edge.

When the impact-type expansible plug is designed in accordance with the present invention, during expansion the annular collar penetrates with its cutting edge into the cylindrical wall of the drilled hole and thereby forms an interlocking connection between the impact-type expansible plug and the masonry.

In accordance with a preferable embodiment of the present invention, a single annular collar is provided. Also, further annular collars with circumferential cutting edges can be provided as well, so as to make more difficult driving of the expansion mandrel into the narrowing internal bore. In special cases, however, it is possible in accordance with another embodiment of the present invention to provide a plurality of annular collars.

In accordance with the invention, the diameter of the annular collar in the unexpanded state is equal to the outside diameter of the impact-type expansible plug. Only after expansion of the expansion sleeve the annular collar projects beyond the diameter of the expansible plug and therefore insures secure anchoring in a cylindrical drilled hole.

The expansion mandrel which is used for expansion has a conical extension with an outer surface extending at a flatter angle relative to the central axis of the expansible plug than the wall of the conically narrowing internal bore. As a result, the expansion mandrel at the beginning of the expanding operation comes to bear against the narrowing internal bore in the forward region where the annular collar is located. Thus, when the expansion mandrel is driven in, the expanding pressure acts directly on the annular collar from inside. Tests have shown that by these means penetration of the circumferential cutting edge of the annular collar into concrete parts of very high solidity is possible. The outer surface may have an angle for example from 12° to 14°, while the wall of the conical internal bore of the expansible region may have an angle of approximately 15° to 18°. Highly advantageous results have been obtained when the conical extension angle was 13° and the internal bore angle was 16°. It should be emphasized that these angles however are not intended to provide limitations of the angle ranges. Depending on the application, different angles may be also provided.

In accordance with an especially advantageous embodiment of the invention, the expansion mandrel can be covered, especially in the region of the conical extension with a low friction layer in order to facilitate the expansion.

In accordance with a further preferred embodiment, the end face of the expansion sleeve is provided with a spacer cap of plastic material, which has a receiving chamber into which the conical extension of the expansion member can penetrate during the expanding process. For avoiding unnecessary hindrance to the expansion of the expansion sleeve, a plastic material is selected so that it has the best possible sliding properties. The spacer cap can be however dispensed with when a stop collar is provided on the expansible plug and projects into the region of the opening of the drilled hole so as to limit the penetration of the expansible plug into the drilled hole. The stop collar forms a depth stop which prevents penetration of the expansible plug to the bottom of the drilled hole. As a result, enough free space remains in the region of the bottom of the drilled hole to receive the conical extension of the expansion mandrel.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
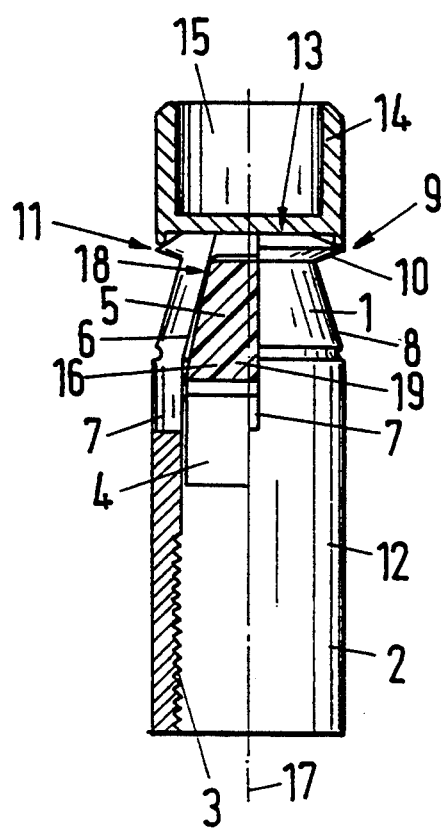
FIG. 1 is a view showing a section of an impact-type expansible plug in accordance with the present invention.

The expansible plug in accordance with the present invention has an expansible extension sleeve which is identified with reference numeral 1 and merges into a fixing part 2 provided with an internal thread 3. The expansible plug further has an expansion mandrel which is identified with reference numeral 4. The expansion mandrel has a conically tapering conical extension 5 which extends into a narrowing internal bore 6 of the expansion sleeve 1.

The expansion sleeve 1 has a plurality of longitudinal slots 7 which are distributed over its periphery. The expansion sleeve 1 also has a conically tapering outer surface 8 which extends to an annular collar 10 formed on the free end 9 of the expansion sleeve 1. The annular collar 10 has a radially directed circumferential cutting edge 11 with a diameter corresponding to the diameter of the shank 12 of the expansible plug.

A spacer cap 14 is arranged on an end face 13 of the expansion sleeve 1. The spacer cap has a receiving chamber 15. The conical extension 5 of the expansion mandrel 4 can be driven into the receiving chamber 15 of the spacer cap 14. The conical extension 5 has an outer surface 16 which is inclined relative to a central axis 17 at an angle smaller than an angle of inclination of the internal bore 6. Therefore a bearing point 18 is produced in the forward region of the expansion sleeve 1.

The outer surface 16 of the expansion mandrel 4 is covered with a low friction material 19 in order to improve the sliding properties of the expansion mandrel. For example, a covering composed of a plastic material can be applied onto the outer surface 16.

Figure 2:
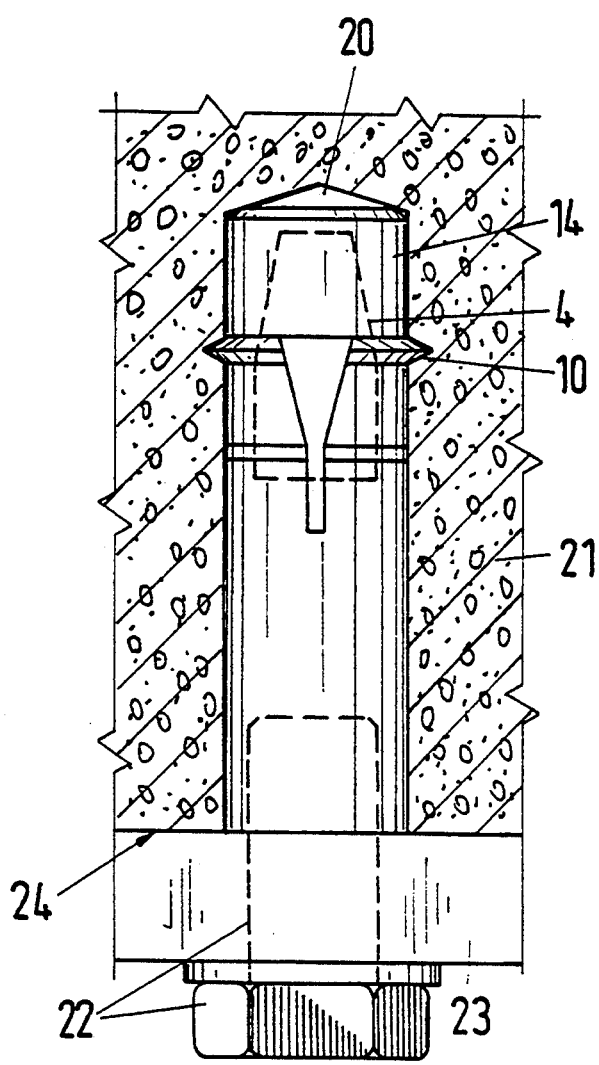
FIG. 2 is a view of the inventive expansible plug entered in a drilled hole in a concrete part.

In use, the expansible plug can be anchored in a drilled hole 20 of a concrete part 21 as shown in FIG. 2. The expansion mandrel 4 is driven by an impact 2 into the position indicated by broken lines and projects with its conical extension 5 into the receiving chamber 15 of the spacer cap 14. The annular collar 10 penetrates through the wall of the drilled hole into the concrete part 21. The expansible plug is thus securely anchored in the concrete part 21, so that an object 23 can be fastened to the wall surface 24 by a screw 22 in the shown manner.

The expansion sleeve 1 and the fixing part 2 preferably are formed as a one-piece sleeve-like metal part. Instead of an internal thread, an external thread can be also formed on the shank 12. In this case the shank must of course extend far enough out of the drilled hole to enable an object 23 to be attached by a screw nut.

It will be understood that each of the elements described above, or two or more together, may also find a useful application in other types of constructions differing from the types described above.

While the invention has been illustrated and described as embodied in an impact-type expansible plug for anchoring in a cylindrical drilled hole, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An impact-type expansible plug for anchoring in a cylindrical drilled hole of a concrete part and the like, comprising an expansion sleeve provided with at least one longitudinal slot and expandable in a drilled hole, said expansion sleeve having a conically narrowing internal bore; and an expansion mandrel drivable into said conically narrowing internal bore of said expansion sleeve, said expansion sleeve having a forward end provided with an annular collar having a radially directed circumferential cutting edge, said expansion sleeve having a portion tapering toward said annular collar, said expansion mandrel having a conical extension which during an expanding process engages in said conically narrowing internal bore of said expansion sleeve, said conical extension having an outer surface which extends at a flatter angle relative to a central axis of said expansion mandrel than said conically narrowing internal bore of said expansion sleeve in an unexpanded state.

2. An impact-type expansible plug as defined in claim 1, wherein said expansion sleeve has a conically tapering outer surface provided with at least one additional annular collar with a radially directed circumferential cutting edge.

3. An impact-type expansible plug as defined in claim 1; and further comprising a shank having an outer diameter, said annular collar having a diameter corresponding to said outer diameter of said shank.

4. An impact-type expansible plug as defined in claim 3, wherein said shank is connected with said expansion sleeve.

5. An impact-type expansible plug as defined in claim 1, wherein said outer surface of said conical extension extends at an angle from 12° to 14°, said conical internal bore having a wall extending at an angle of 15° to 18°.

6. An impact-type expansible plug as defined in claim 1, wherein said narrowing internal bore has a forward portion, said conical extension of said expansion mandrel at the beginning of and during an expanding operation being in contact with said forward portion of said narrowing internal bore.

7. An impact-type expansible plug as defined in claim 1, wherein said expansion sleeve has an end face; and further comprising a spacer cap composed of a slidable material and arranged on said end face of said expansion sleeve, said spacer cap having a receiving chamber for said conical extension of said expansion sleeve so that said conical extension is driven into said receiving chamber and said expansion sleeve is expanded.

8. An impact-type expansible plug as defined in claim 7, wherein said spacer cap is composed of a plastic material.

* * * * *